United States Patent [19]
Saldana

[11] Patent Number: 5,883,381
[45] Date of Patent: Mar. 16, 1999

[54] NIGHT VISION DEVICE HAVING SERIES REGULATOR IN POWER SUPPLY FOR MCP VOLTAGE CONTROL

[76] Inventor: Michael R. Saldana, 1690 Katy St., New Braunfels, Tex. 78130

[21] Appl. No.: 901,415

[22] Filed: Jul. 28, 1997

[51] Int. Cl.[6] .................................................. H01J 40/14
[52] U.S. Cl. .................................. 250/214 VT; 313/524; 313/103 CM; 250/214 C
[58] Field of Search .............................. 250/207, 214 VT, 250/214 C; 313/103 CM, 105 CM, 524–528, 532; 437/5

[56] References Cited

U.S. PATENT DOCUMENTS

| 4,037,132 | 7/1977 | Hoover | 250/214 VT |
|---|---|---|---|
| 4,166,213 | 8/1979 | Hoover | 250/214 VT |
| 4,442,349 | 4/1984 | Blom et al. . | |
| 4,935,616 | 6/1990 | Scott . | |
| 5,130,527 | 7/1992 | Gramer et al. | 313/532 |
| 5,146,077 | 9/1992 | Caserta et al. . | |
| 5,218,194 | 6/1993 | Garbi et al. | 250/214 C |

*Primary Examiner*—Stephone Allen
*Attorney, Agent, or Firm*—Terry L. Miller

[57] ABSTRACT

A night vision device having a power supply which delivers a high voltage level to its microchannel plate (MCP) through a variable resistance device. The voltage to the MCP is monitored and used to control the resistance to the variable resistance device such that the voltage on the MCP remains substantially at an established level, notwithstanding variations in the current being drawn by the MCP.

15 Claims, 6 Drawing Sheets

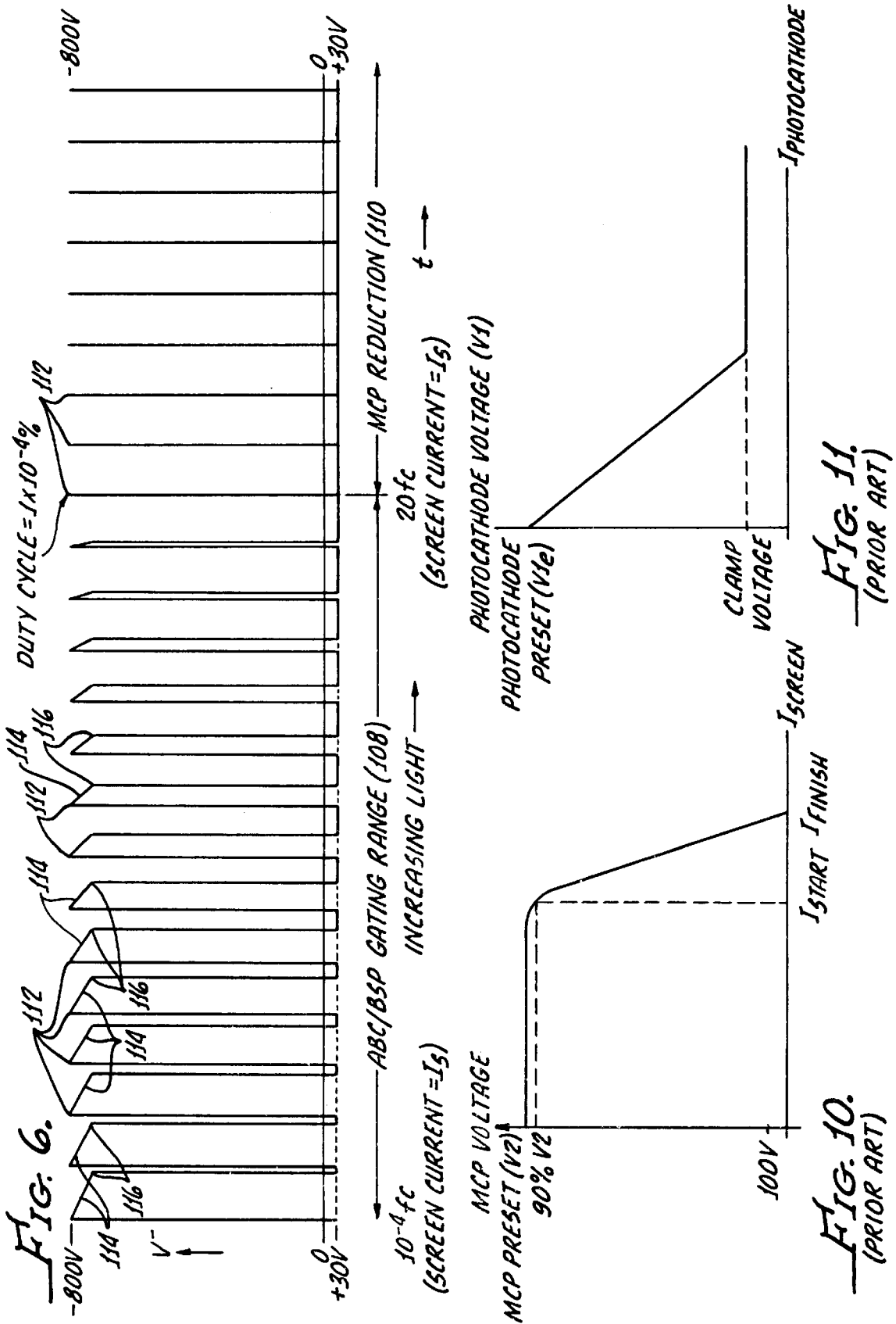

NIGHT VISION DEVICE HAVING SERIES REGULATOR IN POWER SUPPLY FOR MCP VOLTAGE CONTROL

CROSS-REFERENCES TO RELATED APPLICATIONS

This application is related to the following other applications: U.S. patent application Ser. Nos. 08/901,418, 08/901,419, 08/901,423 and 08/901,424 all filed on Jul. 28, 1997.

The entire content of each of these related applications are herein incorporated by reference.

FIELD OF THE INVENTION

The present invention is in the field of night vision devices of the light amplification type. More particularly, the present invention relates to an improved night vision device having an image intensifier tube ($I^2T$) and an improved power supply for the $I^2T$ which operates the tube in a unique way to achieve both improved automatic brightness control and improved bright-source protection. A method of operating the $I^2T$ and a method of operating the improved power supply are also disclosed.

BACKGROUND OF THE INVENTION

Even on a night which is too dark for diurnal vision, invisible infrared light is richly provided by the stars. Human vision cannot utilize this infrared night time light from the stars because the so-called near-infrared portion of the spectrum is invisible for humans. A night vision device of the light amplification type can provide a visible image replicating the night time scene. Such night vision devices generally include an objective lens which focuses invisible infrared light from the night time scene onto the transparent light-receiving face of an $I^2T$. At its opposite image-face, the image intensifier tube provides an image in visible yellow-green phosphorescent light, which is then presented to a user of the device via an eye piece lens.

A contemporary night vision device will generally use an $I^2T$ with a photocathode behind the light-receiving face of the tube. The photocathode is responsive to photons of infrared light to liberate photoelectrons. These photoelectrons are moved by an electrostatic field to a microchannel plate (MCP) having a great multitude of dynodes, or microchannels, with an interior surface substantially defined by a material having a high coefficient of secondary electron emissivity. The photoelectrons entering the microchannels cause a cascade of secondary emission electrons to move along the microchannels so that a spatial output pattern of electrons which replicate an input pattern, and at a considerably higher electron density than the input pattern results. This pattern of electrons is moved from the microchannel plate to a phosphorescent screen by another electrostatic field to produce a visible image.

A power supply for the $I^2T$ provides the electrostatic field potentials referred to above, and also provides a field and current flow to the microchannel plate(s). Conventional night vision devices (i.e., since the 1970's and to the present day) provide automatic brightness control (ABC) and bright source protection (BSP). ABC maintains the brightness of the image provided to the user substantially constant despite changes in the brightness (in infrared and the near-infrared portion of the spectrum) of the scene being viewed. BSP prevents the $I^2T$ from being damaged by an excessively high current level in the event that a bright source, such as a flare or fire, comes into the field of view.

The current drawn by the MCP varies as a function of the average brightness of the image. The output impedance of the power supply for most MCPs is also quite high. As a consequence, the voltage applied to the MCP will vary as a function of average image intensity, unless the voltage to the MCP is regulated.

The voltage delivered to the MCP is also often adjusted to obtain a desired amount of ABC and BSP. For bright image intensities, for example, it is often desirable to reduce the voltage to the MCP.

The conventional method of developing the high voltage needed to drive a MCP has been to generate an oscillating signal from the electricity supplied by a DC battery, to feed that oscillating signal into a step-up transformer, and to direct the output of the transformer into a voltage-multiplying circuit. The output of the voltage-multiplying circuit is then delivered to the MCP.

The conventional method of regulating the voltage to the MCP has been to sense the voltage on the MCP, to generate an error if the voltage on the MCP is other than as desired, and to direct that error into a circuit which adjusts the amplitude of the high voltage AC waveform that is rectified and multiplied by the multiplier to correct for that error.

This conventional approach, however, has several drawbacks. One drawback is that it usually requires the use of a separate transformer to generate and control the amplitude of the voltage delivered to the MCP. Because the power supply for the typical night vision device must also generate and control voltages for other segments of the system, this generally requires the power supply to have several transformers. This multiplicity of transformers increases costs, reduces reliability, and reduces overall power supply efficiency.

Another problem with this type of prior art feedback system is that the reactance, in the transformer often causes the response of the system to be slow and unstable.

SUMMARY OF THE INVENTION

One object of the present invention is to overcome these and other problems in prior art night vision devices and in the power supplies which they include.

Another object of the present invention is to provide a power supply for a night vision device which has only a single transformer.

Another object of the present invention is to provide a power supply for a night vision device which has a fast response and superior stability.

Another object of the present invention is to provide a power supply for a night vision device which is reliable, efficient and of low cost.

These as well as still further objects, features and advantages of the present invention are achieved by connecting a regulator in series between the high DC voltage developed by the power supply and the MCP, by including a variable resistance device for controlling the resistance between the high voltage and the MCP, and by utilizing a controller connected to the variable resistance device to control the resistance of the variable resistance device such that the voltage on the MCP remains substantially at a selected level.

Using this approach, the voltage to the MCP is regulated without having to alter the amplitude of the high voltage AC waveform that is rectified and multiplied by the voltage multiplier. This gives the system the flexibility to use only a single transformer to handle all power supply requirements. It also substantially increases the response time.

In one embodiment of the present invention, the variable resistance device includes a high voltage FET connected in parallel with a resistor. An opto-isolator is inserted in the feedback loop to isolate the high voltage FET from the other feedback circuitry, thus permitting the other feedback circuitry to operate at a low voltage. The opto-isolator and FET are also operated in their linear region.

The feedback circuitry also includes an input for ABC/BSP control signal. This additional input allows the control signal from the ABC/BSP circuitry to select the magnitude of the voltage level which is maintained by the feedback circuitry on the MCP.

Other objects, features, and advantages of the present invention will be apparent to those skilled in the art from a consideration of the following detailed description of a preferred exemplary embodiment thereof taken in conjunction with the associated figures which will first be described briefly.

BRIEF DESCRIPTION OF THE DRAWINGS

FIGS. 4–8, respectively, provide graphical representations of photocathode peak voltage, duty cycle, voltage wave form, microchannel plate voltage, and $I^2T$ output brightness;

FIGS. 9–11, respectively, provide a schematic circuit illustration and graphical representations of microchannel plate voltage and photocathode voltage for a conventional $I^2T$ power supply.

DETAILED DESCRIPTION OF EXEMPLARY EMBODIMENTS OF THE INVENTION

While the present invention may be embodied in many different forms, disclosed herein are specific exemplary embodiments that illustrate and explain the principles of the invention. It should be emphasized that the present invention is not limited to the specific embodiments illustrated.

Figure 1:
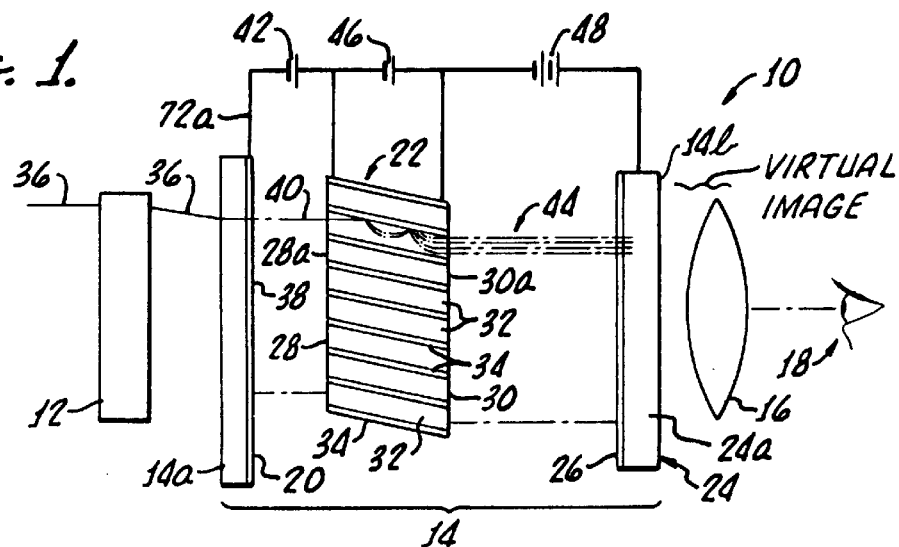
FIG. 1 is a schematic representation of a night vision device embodying the present invention.

Referring first to FIG. 1, there is shown schematically the basic elements of one version of a night vision device 10 of the light amplification type. Night vision device 10 generally comprises a forward objective optical lens assembly 12 (illustrated schematically as a functional block element—which may include one or more lens elements). This objective lens 12 focuses incoming light from a distant night-time scene on the front light-receiving end 14a of an $I^2T$ 14 (as will be seen, this surface is defined by a transparent window portion of the tube—to be further described below). The $I^2T$ provides an image at light output end 14b in phosphorescent yellow-green visible light which replicates the night-time scene. This night time scene would generally not be visible (or would be only poorly visible) to a human's diurnal vision. This visible image is presented by an eye piece lens illustrated schematically as a single lens 16 producing a virtual image of the rear light-output end of the tube 14 at the user's eye 18.

More particularly, $I^2T$ 14 includes a photocathode 20 which is responsive to photons of infrared light to liberate photoelectrons, a microchannel plate 22 which receives the photoelectrons in a pattern replicating the night-time scene, and which provides an amplified pattern of electrons also replicating this scene, and a display electrode assembly 24. In the present embodiment the display electrode assembly 24 may be considered as having an aluminized phosphor coating or phosphor screen 26. When this phosphor coating is impacted by the electron shower from microchannel plate 22, it produces a visible image replicating the pattern of the electron shower. Because the electron shower pattern still replicates the scene viewed via lens 12, a user of the device can effectively see in the dark, by only star light or other low-level illumination. A transparent window portion 24a of the assembly 24 conveys the image from screen 26 outwardly of the tube 14 so that it can be presented to the user 18.

Alternatively, as those ordinarily skilled in the pertinent arts will know, the output electrode assembly may include a charge coupled device (CCD). In this case, the reference numeral 26 would indicate such a CCD, with the output of the image intensifier tube being in the form of an image signal from this CCD. The user of such a device would view the image information on a display, such as a liquid crystal display, or cathode ray tube.

Still more particularly, microchannel plate 22 is located just behind photocathode 20, with the microchannel plate 22 having an electron-receiving face 28 and an opposite electron-discharge face 30. This microchannel plate 22 further contains a plurality of angulated microchannels 32 which open on the electron-receiving face 28 and on the opposite electron-discharge face 30. Microchannels 32 are separated by passage walls 34. The display electrode assembly 24, generally has a conductive coated phosphor screen 26, is located behind microchannel plate 22 with phosphor screen 26 in electron line-of-sight communication with the electron-discharge face 30. Display electrode assembly 24 is typically formed of an aluminized phosphor screen 26 deposited on the vacuum-exposed surface of the optically transparent material of window portion 24a. The focusing eye piece lens 16 is located behind the display electrode assembly 24 and allows an observer 18 to view a correctly oriented image corresponding to the initially received low-level image.

As will be appreciated by those skilled in the art and also viewing now FIG. 2, the individual components of $I^2T$ 14 are all mounted and supported in a tube or chamber (to be further explained below) having forward and rear transparent plates cooperating to define a chamber which has been evacuated to a low pressure. This evacuation allows electrons liberated into the free space within the tube to be transferred between the various components by prevailing electrostatic fields without atmospheric interference that could possibly decrease the signal-to-noise ratio.

As indicated above, photocathode 20 is mounted immediately behind objective lens 12 on the inner vacuum-exposed surface of the window portion of the tube and before microchannel plate 22. Typically, this photocathode 20 is a circular disk-like structure having a predetermined construction of semiconductor materials, and is mounted on a substrate in a well known manner. Suitable photocathode materials are generally semiconductors such as gallium arsenide; or alkali metals, such as compounds of sodium, potassium, cesium, and antimony (commercially available as S-20), carried on a readily available transparent substrate. A variety of glass and fiber optic substrate materials are commercially available.

Considering in somewhat greater detail the operation of the $I^2T$ 14, it is seen that in response to photons 36 entering the forward end of night vision device 10 and passing through objective lens 12, photocathode 20 has an active surface 38 from which are emitted photoelectrons in numbers proportionate to and at locations replicative of the received optical energy of the night-time scene being viewed. In general, the image received will be too dim to be viewed with human natural vision, and may be entirely or partially of infrared radiation which is invisible to the human eye. It is thus understood that the shower of photoelectrons emitted from the photocathode are representative of the image entering the forward end of $I^2T$ 14. The path of a typical photoelectron emitted from the photon input point on the photocathode 20 is represented in FIG. 1 by dashed line 40.

Photoelectrons 40 emitted from photocathode 20 gain energy through an electric field of predetermined intensity gradient established between photocathode 20 and electron-receiving face 28, which field gradient is provided by power source 42. Typically, power source 42 will apply an electrostatic field voltage on the order of 200 to 800 volts to create a field of the desired intensity. After accelerating over a distance between the photocathode 20 and the input surface 28 of the microchannel plate 22, these photoelectrons 40 enter microchannels 32 of microchannel plate 22. As will be discussed in greater detail below, the photoelectrons 40 are amplified by emission of secondary electrons to produce a proportionately larger number of electrons upon passage through microchannel plate 22. This amplified shower of secondary-emission electrons 44, also accelerated by a respective electrostatic field generated by power source 46, then exits microchannels 32 of microchannel plate 22 at electron-discharge face 30.

Once in free space again, the amplified shower of photoelectrons and secondary emission electrons is again accelerated in an established electrostatic field provided by power source 48. This field is established between the electron-discharge face 30 and display electrode assembly 24. Typically, the power source 48 produces a field on the order of 3,000 to 7,000 volts, and more preferably on the order of 6,000 volts in order to impart the desired energy to the multiplied electrons 44.

The shower of photoelectrons and secondary emission electrons 44 (those ordinarily skilled in the art will know that considered statistically, the shower 44 is almost or entirely devoid of photoelectrons and is made up entirely or almost entirely of secondary emission electrons. Statistically, the probability of a photoelectron avoiding absorption in the microchannels 32 is low). However, the shower 44 is several orders of magnitude more intense than the initial shower of photoelectrons 40, but is still in a pattern replicating the image focused on photocathode 20. This amplified shower of electrons falls on the phosphor screen 26 of display electrode assembly 24 to produce an image in visible light.

Figure 2:
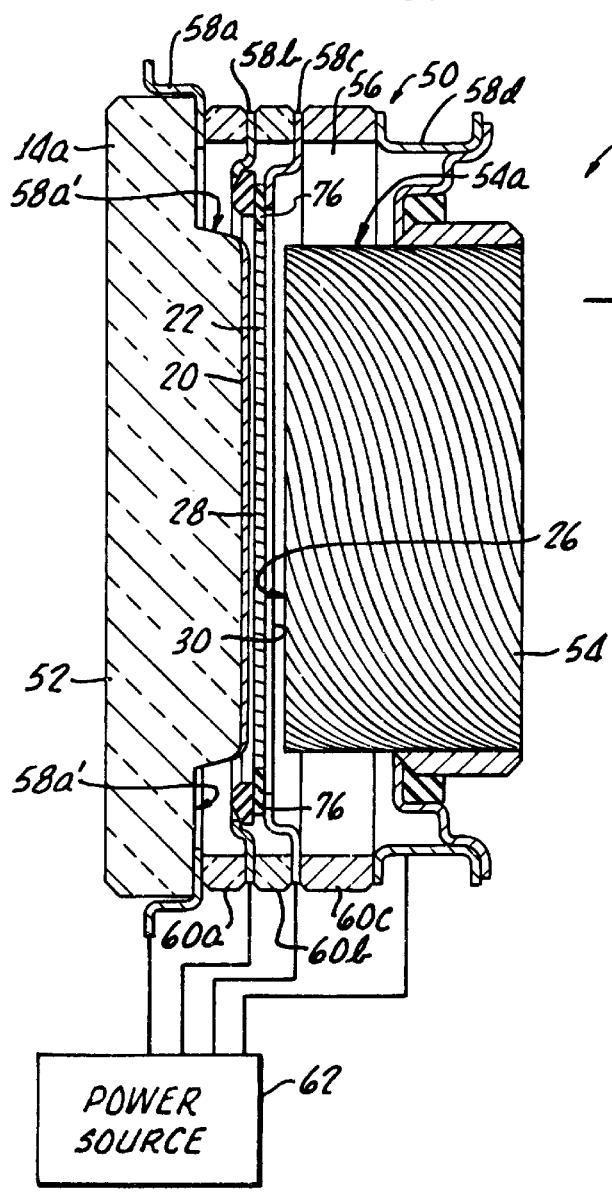
FIG. 2 shows an $I^2T$ in longitudinal cross section, with an associated power supply embodying the present invention.

Viewing FIG. 2 in greater detail, the $I^2T$ 14 is seen to include a tubular body 50, which is closed at opposite ends by a front light-receiving window 52, and by a rear fiber-optic image output window 54. The window 54 defines the light output surface 14b for the tube 14, and carries the coating 26, as will be further described. As is illustrated in FIG. 2, the rear window 54 may be an image-inverting type (i.e., with optical fibers bonded together and rotated 180° between the opposite faces of this window 54 in order to provide an erect image to the user 18. The window member 54 is not necessarily of such inverting type. Both of the windows 52 and 54 are sealingly engaged with the body 50, so that an interior chamber 56 of the body 50 can be maintained at a vacuum relative to ambient. The tubular body 50 is made up of plural metal rings, each indicated with the general numeral 58 with an alphabetical suffix added thereto (i.e., 58a, 58b, 58c, and 58d) as is necessary to distinguish the individual rings from one another.

The tubular body sections 58 are spaced apart and are electrically insulated from one another by interposed insulator rings, each of which is indicated with the general numeral 60, again with an alphabetical suffix added thereto (i.e., 60a, 60b, and 60c). The sections 58 and insulators 60 are sealingly attached to one another. End sections 58a and 58d are likewise sealingly attached to the respective windows 52 and 54. Those ordinarily skilled in the pertinent arts will know that the body sections 58 are individually connected electrically to a power supply 62 (which provides sources 42, 46, and 48, as described above), and which is effective during operation of the $I^2T$ 14 to maintain an electrostatic field most negative at the section 58a and most positive at the section 58d.

Further viewing FIG. 2, it is seen that the front window 52 carries on its rear surface within the chamber 56 the photocathode 20. The section 58a is electrically continuous with the photocathode by use of a thin metallization (indicated with reference numeral 58a') extending between the section 58a and the photocathode 20. Thus, the photocathode by this electrical connection and because of its semi-conductive nature, has an electrostatic charge distributed across the areas of this disk-like photocathode structure. Also, a conductive coating or layer is provided at each of the opposite faces 28 and 30 of the microchannel plate 22 (as is indicated by arrowed numerals 28a and 30a). Power supply 46 is conductive with these coatings by connection to housing sections 58b and 58c. Finally, the power supply 48 is conductive with a conductive layer or coating (possibly an aluminum metallization, as mentioned above) at the display electrode assembly 24 by use of a metallization also extending across the vacuum-exposed surfaces of the window member 54, as is indicated by arrowed numeral 54a.

It should be noted in considering the description below of the structure and operation of the power supply 62, that the term "image intensifier tube" is used in a generic sense. Those ordinarily skilled in the pertinent arts will appreciate that the tube being powered may be configured as an electron multiplier tube in which the output is an electrical signal rather than a visible image. Also, the tube being powered may be of the photodetector, phosphorescence detector, or scintillation detector type, in which the output is also an electrical signal rather than a visible image. Such tubes are generally used, for example, to detect a phosphorescent response in a chemical reagent exposed to exciting light of another color or wavelength, or in a detector for high-energy events having as a result of their occurrence the production of a small number of photons (i.e., as few as one photon per event).

Such application of tubes having a photocathode and a dynode (either of microchannel plate configuration with many dynodes, or of another configuration with one or more dynodes) may experience some or all of the difficulties in operation which are described above in the context of night vision devices. Accordingly, it will be appreciated that a power supply embodying principles of this invention may be used in such applications.

Figure 3:
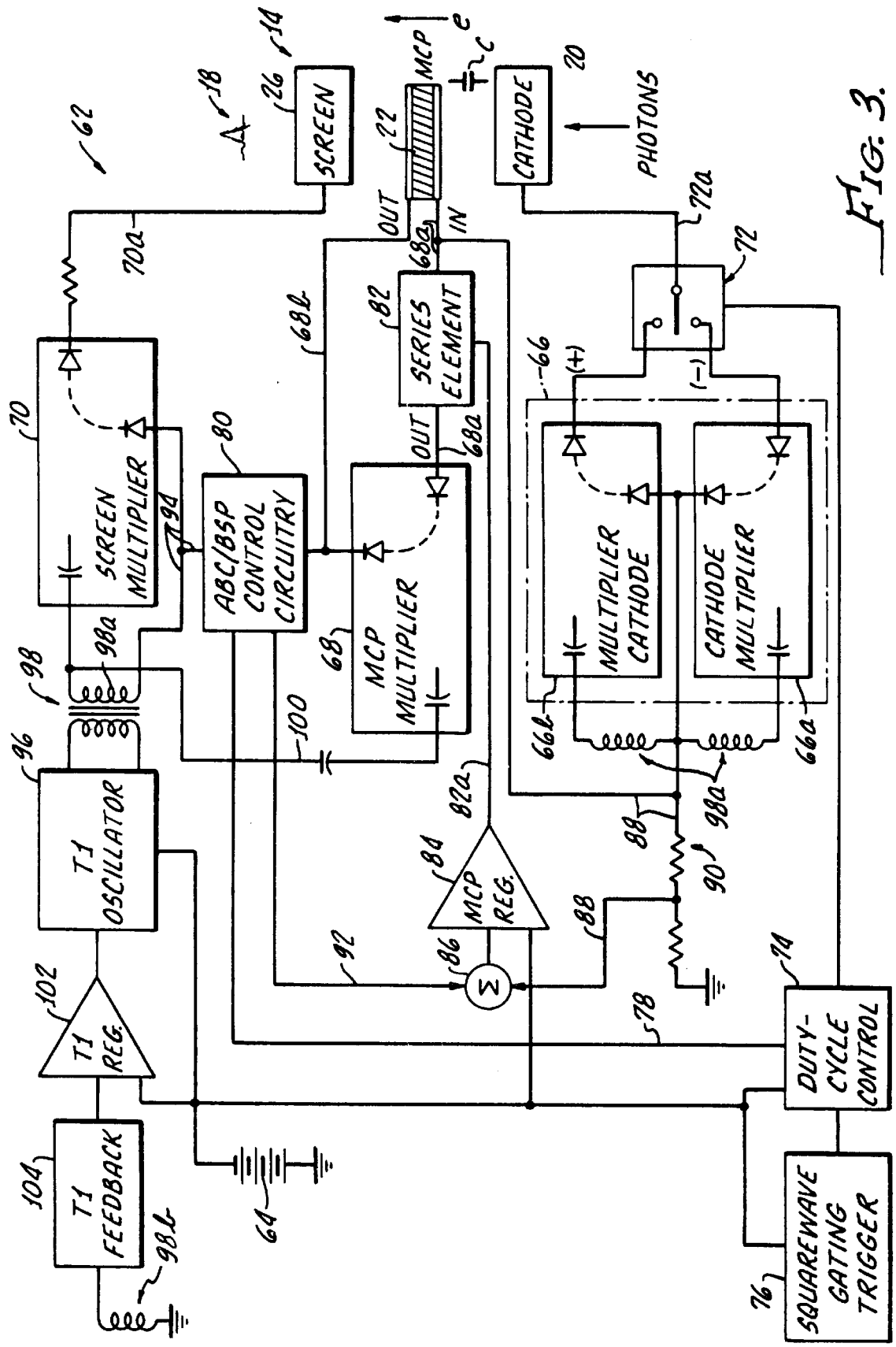
FIG. 3 is a schematic representation of an improved power supply for an $I^2T$ embodying the present invention.

Considering now FIG. 3, it is seen that the power supply 62 includes a power source, which in this case is illustrated as a battery 64. It will be appreciated that a battery 64 is generally used as the power source for portable apparatus, such as night vision devices. However, the invention is not limited to any particular power source. For example, a regulated line-power source could be used to provide input power to a power supply implementing and embodying the principles of the present invention. Considered generally, the power supply 62 includes three voltage multipliers or voltage converters, respectively indicated with the numerals 66, 68, and 70. The voltage converter 66 for the photocathode 20 includes two converters of differing voltage level, and indicated with the numerals 66a and 66b (note that the converter 66b provides a voltage level which is positive with respect to the face 28 of MCP 22, while converter 66a provides a voltage level which is negative relative to the face 28 of the MCP 22. A tri-stable switching network 72 switches controllably between alternative positions either conducting the photocathode 20 to voltage converter 66a, to an open circuit position, or to voltage converter 66b, all via the conductive connection 72a. A duty cycle control 74 controls the switching position of the switching network 72, and receives as inputs a square wave gating trigger signal from an oscillator 76, and a control signal via a conductor 78 from an ABC/BSP control circuit 80. It will be appreciated that the switching network 72 may be configured to switch (i.e., to toggle) between voltage sources 66a and 66b without having an open-circuit condition. This alternative would yield essentially a square-wave voltage on the graph of FIG. 6.

Power supply to the microchannel plate 22 (that is, to the conductive layers or metallizations 28a and 30a) is effected from the voltage converter 68 via connections 68a and 68b. Interposed in connection 68a is a series element 82, which in effect is a variable resistor. A high-voltage MOSFET may be used for element 82, and the resistance of this element is controlled over a connection 82a by a regulator circuit 84. Regulator circuit 84 receives a feed back control signal from a summing junction 86, which receives an input from conductor 88 via a level-adjusting resistor 90, and also receives an input via conductor 92 from the ABC/BSP control circuit 80. Conductor 88 also provides a feed back signal of the voltage level applied to the input face 28 (i.e., at metallization 28a) of the microchannel plate 22 into the voltage converter circuit 66. Note that this conductor 88 provides a reference voltage level of microchannel plate voltage on face 28, not a signal of photocathode voltage level.

The voltage converter 70 has connection to the screen 26 via a connection 70a, and provides a feed back of screen current level into ABC/BSP control circuit via conductor 94. Energy flow in the circuit 62 is provided by an oscillator 96 and coupled transformer 98, with output windings 98a providing energy input to voltage converters 66 and 70, and a conductor 100 providing energy to voltage converter 68. It is noted that the circuit 62 requires only the single transformer 98, which advantageously reduces cost, size, weight, and parts count for the power supply; and also improves reliability for the power supply and night vision device 10. The oscillator 96 receives a control feed back via a regulator 102 and a feed back circuit 104, having an input from a feedback winding 98b of transformer 98.

Figures 4, 5, 7, 8:
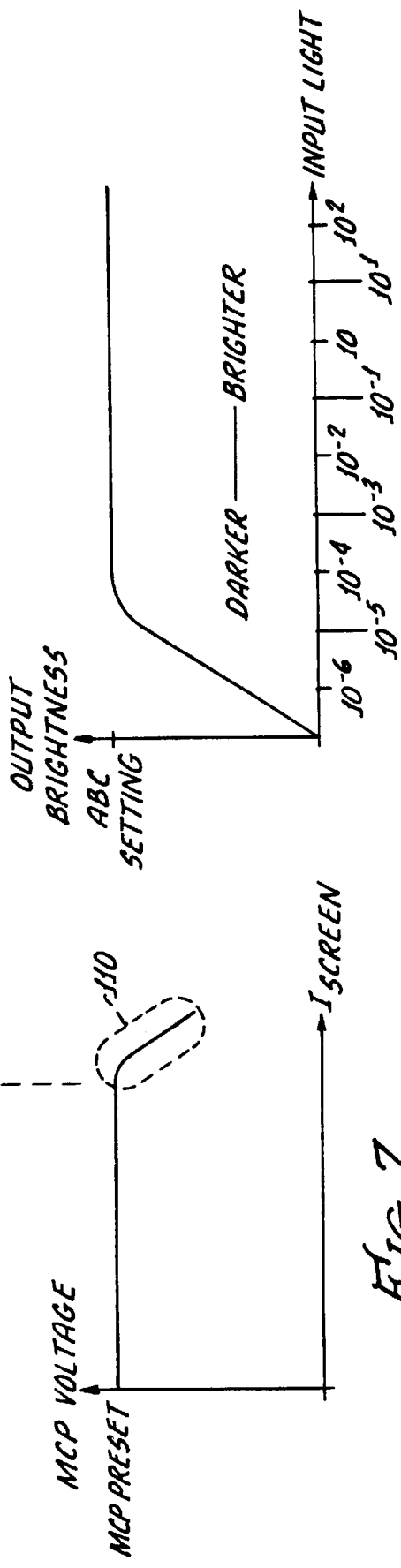

Having considered the structure of the circuit 66, attention may now be given to its operation, and the cooperation of this circuit operation with the operation of the I²T 14. Attention now to FIGS. 4–8, with attention first to FIG. 4, shows that the most negative voltage level produced by voltage converter 66a for application by power supply circuit 66 to the photocathode 20 of the tube 14 is always constant at a selected voltage level. Comparing this FIG. 4 to the voltage curve of FIG. 11 reveals that the prior art teaches to vary the voltage applied to the photocathode in order to provide a BSP function. However, FIG. 5 shows that the power supply circuit 66 provides a BSP function by keeping the voltage applied to the photocathode 20 constant (recalling FIG. 4) while gating connection of the photocathode between connection to this constant voltage source (i.e., about −800V), to an open circuit (i.e., voltage off), and to a lower voltage i.e., relatively more positive relative to the face 28 of MCP 22—about +30V) provided by voltage converter 66b (simulating darkness for the photocathode 20).

When the photocathode 20 is connected to voltage source 66b (i.e., to a source of about +30 volts relative to the face 28 of MCP 22), this condition might be considered a "hard turn off" for the photocathode. Under this condition, the photocathode is not responsive to photons received from the scene being viewed. This gating function is carried on at a constant cyclic rate and cycle interval, while varying the duty cycle of the applied constant voltage preferably as a function of current level sensed at screen 26 (i.e., by feed back over conductor 94).

It should be noted, however, that this gating function can be carried out with respect to other parameters of operation of the image intensifier tube 14. For example, an alternative way of controlling the gating function would be to use the current level at face 30 i.e., at electrode 30a) as a controlling parameter.

FIG. 5 shows that over a range of screen current indicated with the numeral 106, the duty cycle of the applied constant voltage to the photocathode 20 is fixed at 100%. However, at screen current levels above a selected level, the duty cycle progressively ramps down substantially linearly to a low level of essentially $10^{-4}\%$ as a function of increasing screen current, as is indicated by numeral 108. It will be noted that FIGS. 5 and 7 are drawn to the same scale of screen current along the abscissa of the of the graph, and that these graphs are arranged one vertically above the other for the reader's convenience in understanding the relationship of photocathode gating duty cycle to voltage applied to the microchannel plate 22.

Returning attention to FIG. 5 and with attention now to FIG. 6 it is seen that for screen current levels above that at which the duty cycle for gating of the constant voltage to the photocathode 20 reaches its lowest value, an additional function of BSP is provided by decreasing the voltage applied to the microchannel plate 22. It will be noted that for all screen current levels lower than those necessary to initiate this BSP protection function, the voltage applied across the microchannel plate 20 is a constant. Thus, the microchannel plate 22 operates at its designed voltage differential across electrodes 28a and 30a. The reduction of voltage level applied across the microchannel plate 20 is effected by action of the series element 82 increasing its resistance under control of MCP regulator 84. As noted this regulator 84 receives a summed input from the conductor 88 via the level adjusting resistor 90, and from the ABC/BSP control circuit 80, which itself is responsive to the level of current sensed at screen 26 by conductor 94.

Figure 9:
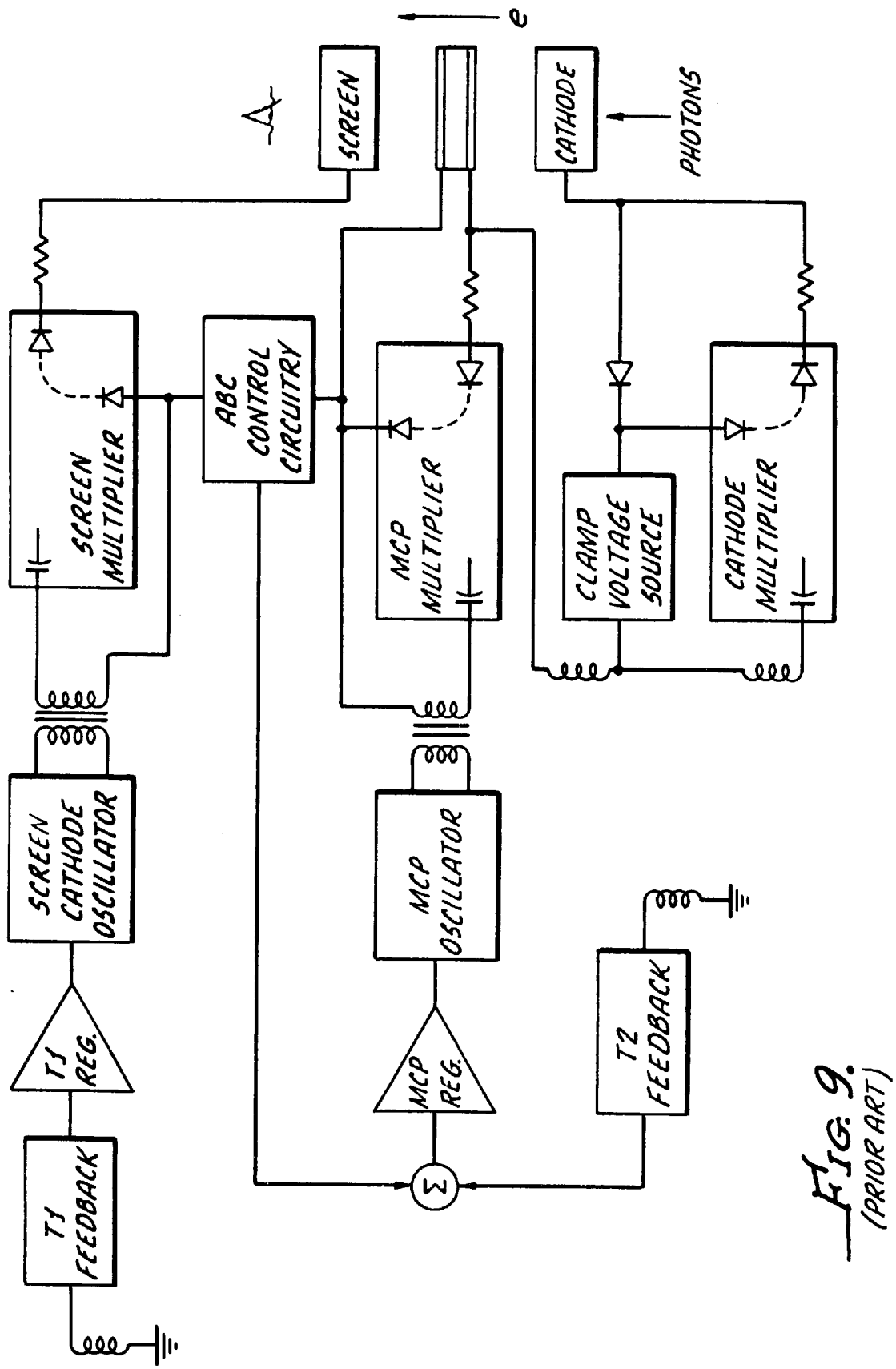

Comparing this operation of power supply circuit 62 to the operation of the conventional power supply discussed above with reference to FIGS. 9–11, and viewing FIG. 10, it is seen that the power supply 62 avoids the problem of loss of resolution for an I²T caused in the conventional power supplies by operation with too low a voltage on a microchannel plate.

The voltage wave form of FIG. 6 might be produced by a rapid increase of light input such that the ABC function, and then the BSP function operate in succession. For this reason, FIG. 6 is also annotated with a time arrow, indicating that in this instance time proceeds from left to right on the graph. It will be noted that the constant voltage level gated to the photocathode 20 (i.e., from voltage converter 66a) is substantially −800V, while the positive voltage level from voltage converter 66b is about +30 volts relative to the face 28 (electrode 28a) of the microchannel plate 22.

The reader should not be confused by the similarity in appearance between the graph of FIG. 10 and that of FIG. 5, they are illustrating differing values. FIG. 10 relates to conventional microchannel plate voltage, while FIG. 5 is voltage gating duty cycle to the photocathode 20 as provided by the power supply 62.

In view of the above, attention now to FIG. 6 provides an understanding of the microchannel plate voltage level as the duty cycle for the application of the constant peak voltage seen in FIG. 4 is varied in response to changing light levels in the viewed scene, and in response to the changes in screen current level for the I²T. FIG. 6 shows that portion of the duty cycle operation corresponding to portions 108 and 110 of FIGS. 5 and 7. Increasing light levels and increasing screen current levels go from left to right on the graph of FIG. 6. It will be noted that a portion of the graph of FIG. 6 is not shown (i.e., to the left of that part shown). This portion which is not shown would correspond to section 106 of FIG. 5, and in this realm of operation the duty cycle is always 100%.

At the left side of the graph of FIG. 6, it is seen that the duty cycle is here slightly less than 100%, and that within the interval for each duty cycle the voltage applied to photocathode 20 is initially the high constant peak voltage indicated in FIG. 4 (i.e., indicated at numerals 112), and then decays over a very short time interval at a natural open-circuit, capacitor-discharge rate (indicates at segments 114 of the voltage curve). This voltage decay is actually a very small voltage because of the short time interval, and occurs because the virtual capacitor existing between the photocathode 20 and the conductive metallization on the front light-receiving face of the microchannel plate 22 (i.e., conductive coating 28a) is open-circuit when the switching network 72 (recalling FIG. 3) is not conducting the photocathode to neither voltage converter 66a or to voltage converter 66b. This virtual capacitor is diagrammatically indicated on FIG. 3, and indicated with the character "C".

Next in each duty cycle, the network 72 conducts the photocathode to voltage converter 66b, which effectively replicates darkness for the photocathode 20 by dropping the voltage as is indicated at voltage cutoff's 116 of FIG. 6. Effectively, this dropping (i.e., more positive) voltage level for the photocathode 20 is a hard turn off. That is, when the applied voltage at the photocathode 20 is about +30 volts relative to the face 28 of microchannel plate 22, then electrons will not flow from this photocathode to the microchannel plate in response to photon of light hitting the photocathode. This voltage cutoff 116 is provided by having voltage converter 66b provide a voltage which is about 30 volts positive with respect to the voltage provided at coating 28a on the front face of the microchannel plate 22 by voltage converter 68.

Restated, it is seen that in essence when the photocathode 20 operates, it always operates substantially at the high constant peak voltage seen in FIG. 4. When the photocathode 20 is not operating, it is switched to a voltage which replicates a dark field for the photocathode (i.e., the +30 volts from voltage converter 66b). The photocathode 20 operated by the power supply 62 of the present invention is switched between operation at its designed voltage level and dark-field condition at a duty cycle which varies dependent upon the light intensity of the scene being viewed, as indicated by current flow at the screen 26. This function is carried out in accord with the duty cycle function indicated in FIG. 5 in order to provide ABC. The result of this ABC operation is illustrated in FIG. 8, which indicates that over a broad range of input light levels, a substantially constant brightness for the image presented to a user of the night vision device 10 is achieved. At the left-hand side of FIG. 8 is seen a linearly decreasing section of the brightness curve from the image intensifier tube 14. This occurs with very dim lighting levels, but the image intensifier tube 14 will still provide a usable image in at least a portion of this regime of its operation.

Returning to consideration of FIGS. 5 and 7, within section 108, the duty cycle is progressively decreased until it reaches it low level of $10^{-4}\%$ as a function of increasing screen current. If light level of the viewed scene continues to increase (indicative of a bright source in the scene), then the duty cycle maintains its low $10^{-4}\%$ level, while the bright source protection function explained above is effected in section 110, recalling FIG. 7.

Figure 12:
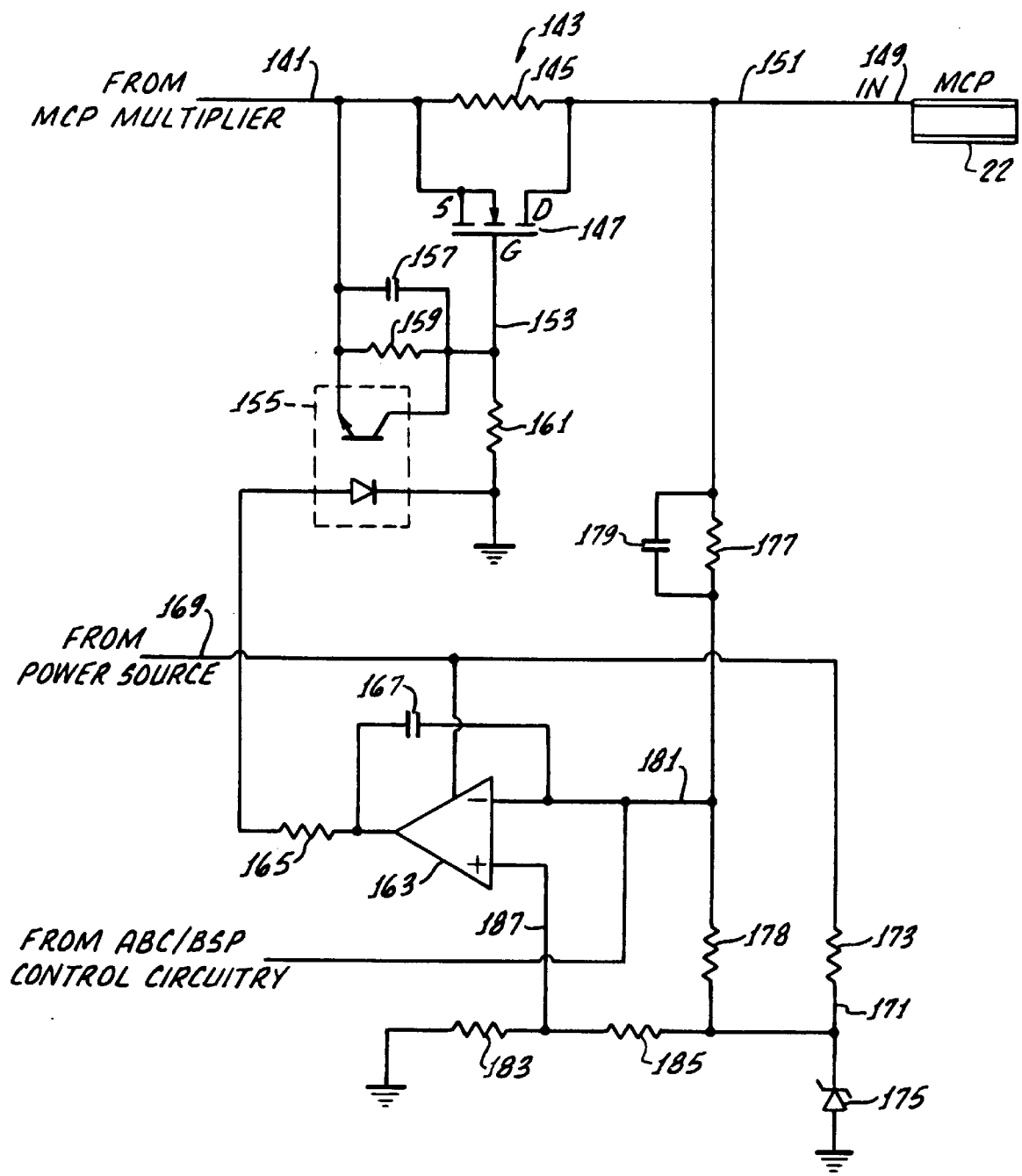
FIG. 12 is a schematic representation of one embodiment of circuitry used to implement the series element shown in FIG. 3, circuitry which includes other elements in FIG. 3 for clarification purposes.

FIG. 12 is a schematic representation of one embodiment of circuitry used to implement the series element 82 shown in FIG. 3, circuitry which includes other elements in FIG. 3 for clarification purposes.

As shown in FIG. 12, the high voltage DC output from the MCP multiplier 68 is directed over connection 141 to a variable resistance device 143 consisting of a fixed resistor 145 connected in parallel to the source and drain of a high voltage FET 147. The output of the variable resistance device 143 is connected to the input 149 of the MCP 22 over a connection 151.

The gate 153 of the FET 147 is controlled by the output of an opto-isolator 155. The opto-isolator is also connected to a network consisting of a capacitor 157 connected in parallel to a resistor 159. The gate 153 of the FET 147 is also connected to a resistor 161 to ground.

The input of the opto-isolator 155 is connected to the output of an operational amplifier 163 through a resistor 165. An integrating capacitor 167 is connected between the output and inverting input of the operational amplifier 163. Also connected to the inverting input of the operational amplifier 163 is the output from the ABC/BSP control circuitry 80 shown in FIG. 3.

Power from the power source (such as the battery 64 shown in FIG. 3) is also directed over a connection 169 to power the operational amplifier 163, as well as to establish a reference voltage at point 171 through the use of a series resistor 173 and a band gap voltage reference 175. This band gap voltage reference may be effected by use of a zenor diode, which is indicated with reference numeral 175. The voltage to the input of the MCP 149 is also delivered through a resistor-divider network consisting of a resistor 177 and a resistor 178. A capacitor 179 is used to provide loop stability in this feedback system. The divided voltage is also delivered to the inverting input of the operational amplifier 163 over a connection 181. A divider network of compensation resistors 183 and 185 is also connected to the non-inverting input of the operational amplifier 163 over a connection 187.

In operation, the voltage delivered to the MCP is monitored by the operational amplifier at 163. When the voltage on the inverting input of the operational amplifier 163 goes above the reference voltage being delivered to the non-inverting input to the operational amplifier 163, signifying that the absolute value of the MCP voltage is too low, the capacitor 167 will integrate the error and provide a signal to the opto-isolator 155 to increase the amount by which the FET 147 is turned on. This decreases the overall resistance of the variable resistance device 143, thus increasing the voltage to the MCP.

Conversely, when the voltage to the MCP is too high, the capacitor 167 will integrate this opposite error, and a reduced signal will be delivered to the opto-isolator 155 to decrease the amount by which the FET 147 is turned on. This increases the overall resistance of the variable resistance device 143, thus lowering the voltage to the MCP.

The net effect of this feedback control circuit is to insure that the inverting and non-inverting inputs to the operational amplifier 163 are at the same level and, as a consequence, that the voltage on the input to the MCP remains constant, notwithstanding differences in the current which the MCP might draw.

The voltage which is delivered to the inverting input of the operational amplifier 163 is a function of both the voltage on the MCP and the signal from the ABC/BSP control circuitry. In operation, the value of the resistor 178 is selected to establish a steady-state voltage at the non-inverting input to the operational amplifier 163 which corresponds to the desired voltage on the MCP 22 after being divided by the resistor divider network. The resistor 178 may be a variable-resistance device, such as a potentiometer. In can also be a fixed resistor connected in series with a potentiometer, thus providing a finer degree of tuning.

As should be obvious to those skilled in the art, the input voltage to the inverting input of the operational amplifier 163 is also a function of the signal received from the ABC/BSP control circuitry. This results in a single circuit functioning to maintain the voltage at the input to the MCP, while at the same time functioning to adjust that voltage to a level dictated by the signal received from the ABC/BSP control circuitry.

It should also be obvious to those skilled in the art that both the opto-isolator 155 and the FET 147 are usually being operated in their linear region.

Although the values and types of components which are illustrated can vary widely, one operative embodiment of the present invention employs the following components:

| ITEM | DESCRIPTION |
|---|---|
| 145 | 1G ohm resistor |
| 147 | High Voltage MOSFET, N-channel |
| 157 | Approx. 100 pf capacitor |
| 159 | 2.5M ohm resistor |
| 161 | 1G ohm resistor |
| 163 | Harris HA7611 op amp |
| 165 | 100 ohm resistor |
| 167 | .001 m.f. capacitor |
| 173 | 30K ohm resistor |
| 175 | 1.2 band gap voltage reference |
| 177 | IG ohm resistor |
| 178 | 1M ohm resistor |
| 179 | 30 p.f. capacitor |
| 183 | 1M ohm resistor |
| 185 | 200K ohm resistor |

Those skilled in the art will appreciate that the embodiments of the present invention depicted and described above are not exhaustive of the invention. For example, the ABC and BSP aspects of the invention may be implemented separately of one another if desired. The voltage regulating system shown in FIG. 12 can also be used with prior art night vision devices which do not utilize an alternating voltage waveform delivered to the cathode, such as the waveform shown in FIG. 6. The circuitry shown in FIG. 12 can also vary widely, so long as the voltage control occurs downstream of the transformer output.

Those skilled in the art will further appreciate that the present invention may be embodied in other specific forms without departing from the spirit or central attributes thereof. Because the foregoing description of the present invention discloses only an exemplary embodiment thereof, it is to be understood that other variations are recognized as being within the scope of the present invention. Accordingly, the present invention is not limited to the particular embodiment which has been described in detail herein. Rather, reference should be made to the appended claims to define the scope and content of the present invention.

I claim:

1. A night vision device having an objective lens for receiving light from a scene being viewed and directing this light to an image intensifier tube, said image intensifier tube providing a visible image of the scene being viewed, and an eyepiece lens providing this visible image to a user of the night vision device; said image intensifier tube including a photocathode receiving photons from the scene and releasing photoelectrons in a pattern replicating the scene, a microchannel plate receiving the photoelectrons and providing a shower of secondary emission electrons in a pattern replicating the scene, and a screen receiving the shower of secondary emission electrons and producing a visible image replicating the scene; said night vision device comprising:

a source of electrical power at a selected voltage level, and a power supply circuit receiving said electrical power at said selected voltage level to responsively provide electrical power at higher voltage levels to said photocathode, to opposite faces of said microchannel plate, and to said screen;

said power supply circuit including a regulator connected in series between said higher voltage level and said microchannel plate;

said regulator including a variable resistance device for controlling the resistance between said higher voltage level and said microchannel plate and a controller connected to said variable resistance device to control the resistance of said variable resistance device such that the voltage on the microchannel plate remains substantially at an a certain level established by said controller;

whereby said certain voltage on said microchannel plate is maintained notwithstanding variations in the current being drawn by said microchannel plate.

2. The night vision device of claim 1 wherein said variable resistance device includes a high voltage FET connected in parallel with a resistor.

3. The night vision device of claim 2 wherein said FET operates in its linear region.

4. The night vision device of claim 1 wherein said variable resistance device is connected to said controller through an opto-isolator.

5. The night vision device of claim 4 wherein said opto-isolator operates in its linear region.

6. The night vision device of claim 1 wherein said power supply generates a brightness control signal for automatic brightness control and/or brightness source protection and wherein said controller includes an input for said brightness control signal and causes the established level of the voltage on said microchannel plate to vary as a function of said brightness control signal.

7. The night vision device of claim 1 wherein said power supply circuit includes only a single transformer.

8. A power supply for delivering a high voltage level to a microchannel plate in a night vision device, said power supply including a regulator connected in series between said high voltage level and said microchannel plate, said regulator including a variable resistance device for controlling the resistance between said high voltage level and said microchannel plate and a controller connected to said variable resistance device to control the resistance of said variable resistance device such that the voltage on the microchannel plate remains substantially at an established level established by said controller, notwithstanding variations in the current being drawn by said microchannel plate.

9. The power supply of claim 8 wherein said variable resistance device includes a high voltage FET connected in parallel with a resistor.

10. The power supply of claim 9 wherein said FET operates in its linear region.

11. The power supply of claim 8 wherein said variable resistance device is connected to said controller by an opto-isolator.

12. The power supply of claim 11 wherein said opto-isolator operates in its linear region.

13. The power supply of claim 8 wherein said power supply generates a brightness control signal for automatic brightness control and/or brightness source protection and wherein said controller includes an input for said brightness control signal and causes the established level of the voltage on said microchannel plate to vary as a function of said brightness control signal.

14. The power supply of claim 8 wherein said power supply includes only a single transformer.

15. In a night vision device containing a microchannel plate connected through a regulator containing a variable resistance device to a source of high voltage, a method for maintaining the voltage on the microchannel plate at a substantially established level, notwithstanding variations in the current being drawn by the microchannel plate, said method including the steps of sensing the voltage on the microchannel plate and increasing the resistance of the variable resistance device when the absolute value of the sensed voltage increases beyond the established level and decreasing the resistance when the absolute value of the sensed voltage decreases beyond the established level.

* * * * *